US008330729B2

(12) United States Patent
Tachi et al.

(10) Patent No.: US 8,330,729 B2
(45) Date of Patent: Dec. 11, 2012

(54) ELECTRIC TACTILE SENSE PRESENTING DEVICE AND ELECTRIC TACTILE SENSE PRESENTING METHOD

(75) Inventors: Susumu Tachi, Tokyo (JP); Hiroyuki Kajimoto, Tokyo (JP); Yonezo Kanno, Yotsukaido (JP)

(73) Assignees: The University of Tokyo, Tokyo (JP); Eye Plus Plus, Inc., Tokyo (JP)

( * ) Notice: Subject to any disclaimer, the term of this patent is extended or adjusted under 35 U.S.C. 154(b) by 1050 days.

(21) Appl. No.: 11/908,051

(22) PCT Filed: Mar. 9, 2006

(86) PCT No.: PCT/JP2006/304574
§ 371 (c)(1),
(2), (4) Date: Nov. 25, 2008

(87) PCT Pub. No.: WO2006/095806
PCT Pub. Date: Sep. 14, 2006

(65) Prior Publication Data
US 2009/0174671 A1    Jul. 9, 2009

(30) Foreign Application Priority Data
Mar. 9, 2005    (JP) ................................ 2005-064874

(51) Int. Cl.
*G06F 3/041*    (2006.01)

(52) U.S. Cl. ........................................ 345/173; 345/156

(58) Field of Classification Search .......... 345/156–173; 178/18.1–18.9
See application file for complete search history.

(56) References Cited

U.S. PATENT DOCUMENTS

| | | | |
|---|---|---|---|
| 2003/0117371 A1* | 6/2003 | Roberts et al. | 345/156 |
| 2004/0176737 A1* | 9/2004 | Henley et al. | 604/501 |
| 2005/0052428 A1* | 3/2005 | Hayashi et al. | 345/173 |
| 2006/0046031 A1* | 3/2006 | Janevski | 428/195.1 |
| 2008/0129705 A1* | 6/2008 | Kim et al. | 345/174 |

FOREIGN PATENT DOCUMENTS

| | | |
|---|---|---|
| EP | 1496425 | 1/2005 |
| JP | 2002-328596 | 11/2002 |
| JP | 2004-319255 | 11/2004 |
| JP | 2004319255 A * | 11/2004 |
| JP | 2005-004058 | 1/2006 |

OTHER PUBLICATIONS

Kajimoto, H., et al., "Tactile feeling display using functional electrical stimulation," ICAT '99 International Conference on Virtual Reality and Telexistence (Dec. 1999).
Takahashi, H., "Electro-Tactile Display with Localized High-Speed Switching," ICAT 2002 International Conference on Virtual Reality and Telexistence, Dec. 2002.

* cited by examiner

*Primary Examiner* — Amare Mengistu
*Assistant Examiner* — Premal Patel
(74) *Attorney, Agent, or Firm* — Ladas & Parry, LLP

(57) ABSTRACT

An electro-tactile display comprises at least one current source, arrayed electrodes, and a switching circuit for connecting each electrode to the current source or to ground. The electro-tactile display is characterized by selecting one or a plurality of electrodes from the arrayed electrodes and connecting the selected electrodes to the current source to provide current source electrodes, alternately connecting neighboring electrodes in the vicinity of said current source electrodes to the current source and to ground, connecting a plurality of remaining electrodes other than the neighboring electrodes to ground to provide ground electrodes, and providing electrical stimulation from the current source electrodes wherein the current source electrodes are spaced apart from the ground electrodes via the neighboring electrodes. Tactile sensations are presented by switching over the current source electrodes at a predetermined time interval.

8 Claims, 10 Drawing Sheets

FIG.10 velocity vector

The Symposium will feature both oral presentations and poster/demonstration sessions. The organizers reserve the right to assign papers to either category based on reviews and space constraints. Authors may indicate preference for oral or poster presentation or no preference. All submissions will undergo peer review. Accepted submissions in both categories will appear in the published Haptics Symposium obtained image (15fps)

stimulating area (200fps)

→ Odd frame
- - → Even frame

ELECTRIC TACTILE SENSE PRESENTING DEVICE AND ELECTRIC TACTILE SENSE PRESENTING METHOD

TECHNICAL FIELD

The present invention relates to an electro-tactile display and an electro-tactile display method.

BACKGROUND ART

An electro-tactile sense presenting apparatus (an electro-tactile display) is a tactile sense presenting apparatus for directly stimulating tactile nerves under the skin from electrodes on the skin. A basic electrical stimulation procedure using electrodes arranged in a two-dimensional matrix is shown in FIG. 2. Each electrode can be connected to a current source and to ground using two switches in a configuration known as a half-bridge circuit. By switching over these switches, each electrode may be made to operate as a current source (current source electrode) or ground (ground electrode). By making an electrode at a location for stimulate a current source and putting other electrodes to ground, a current path may be formed under the skin in a direction from a current source electrode to ground electrodes so that nerve axons are stimulated.

The case where the distance between electrodes is small is considered here. At this time, a current path formed below the skin is shallow because the distance between a current source electrode and the ground electrodes is short. A problem therefore occurs where nerve axons that are at deep sections cannot be sufficiently stimulated. Specifically, in the case of the skin of a fingertip, human tactile resolution is in the order of 1.5 mm and it is therefore wished to arrange electrodes at approximately 1.5 mm. However, an appropriate distance between the current source electrode and ground electrode in order to stimulate nerves underneath the skin is about 2 to 3 mm. The problem described above is therefore extremely important.

If, at the switching circuit of FIG. 2, a high-impedance mode (a state where the two switches are both open) is possible, by taking electrodes neighboring the current source electrode to be high-impedance electrodes and taking electrodes at locations a little further away to be ground electrodes, it becomes possible to broaden the distance between the current source and ground and this problem no longer occurs (right side of FIG. 3). In non-patent document 1, a switching circuit is disclosed that provides a high-impedance mode where the two switches are open, and a short-circuit mode where the two switches are closed.

Here, when actually designing a device incorporating the above system, it is necessary to use an integrated circuit having a large number of half-bridge circuits in order to miniaturize the switching circuit portion. However, half-bridge circuits adopted in integrated circuits compatible with high-voltages do not have the high-impedance mode and short-circuit mode. It should also be considered that the main application of a high-voltage half-bridge circuit is to control micro-machines. In this application, these modes are not only unnecessary, but may also be harmful. Integrated circuits that are actually utilized do not have the high-impedance mode and this method therefore cannot be used for solving the problem.

Non-patent document 1: Takahashi, Kajimoto, Kawakami, Tachi, "Electro Tactile Display with Localized High-Speed Switching", Proceedings of the Virtual Reality Society of Japan Seventh Annual Conference (Tokyo, September 2002), pp. 145-148, 2002.

It is therefore an object of the present invention to stimulate nerve axons of deep sections in a superior manner in electrical stimulation using an array of electrodes without deteriorating spatial resolution of the tactile stimulation even in cases where interval between the electrodes is narrow.

DISCLOSURE OF THE INVENTION

In accordance with one aspect of the present invention, an electro-tactile display comprises: at least one current source; arrayed electrodes; a switching circuit for connecting each electrode to the current source or to ground; and electrode selecting/switching means for selecting an electrode connected to the current source and an electrode connected to ground via the switching circuit and switching over the selected electrodes. The electrode selecting/switching means further comprises: first electrode selecting/switching means for connecting one or a plurality of electrodes at a position or positions for stimulation to the current source to provide one or a plurality of current source electrodes and switching over the current source electrodes at a predetermined time interval to present tactile sensations; and second electrode selecting/switching means for alternately connecting neighboring electrodes in the vicinity of the current source electrodes to the current source and to ground at a time interval shorter than the predetermined time interval.

In accordance with another aspect of the present invention, an electro-tactile displaying method is characterized by selecting one or a plurality of electrodes from arrayed electrodes and connecting the selected electrodes to a current source to provide one or plurality of current source electrodes; alternately connecting neighboring electrodes in the vicinity of the current source electrodes to the current source and to ground; connecting a plurality of remaining electrodes other than the neighboring electrodes to ground to provide a plurality of ground electrodes; providing electrical stimulation from the current source electrodes, the current source electrodes being spaced apart from the ground electrodes via the neighboring electrodes; and switching over the current source electrodes at a predetermined time interval to present tactile sensations. Switching of the neighboring electrodes of the current source electrodes is carried out at higher speed than the switching for providing electro-tactile sensations.

According to an electro-tactile display using arrayed electrodes, an electrode (a current source electrode) at a position for stimulation is connected to a current source, and other electrodes are connected to ground. A current path flowing from the current source electrode to ground is therefore formed at nerve axons beneath the skin, and nerve axons are stimulated. In accordance with the present invention, selecting one or a plurality of electrodes from the arrayed electrodes and connecting the selected electrodes to a current source to provide one or plurality of current source electrodes; alternately connecting neighboring electrodes in the vicinity of the current source electrodes to the current source and to ground; connecting a plurality of remaining electrodes other than the neighboring electrodes to ground to provide a plurality of ground electrodes; and providing electrical stimulation from the current source electrodes wherein the current source electrodes are spaced apart from the ground electrodes via the neighboring electrodes.

By switching over connection of neighboring electrodes in the vicinity of an electrode at a position for stimulation between the current source and ground at high-speed, it is possible to adjust the time average of current flowing in and flowing out of the neighboring electrodes. In a preferred embodiment, switching timing is adjusted so that the time average of current flowing in the neighboring electrodes becomes zero. However, as long as formation of a direct current path between an electrode at a position for stimulation (a current source electrode) and neighboring electrodes (as long as a current path is mainly to be formed from the a current source electrode to the ground electrodes) is unlikely, then the time averaging of the amount of current does not have to be zero. Stimulation of nerve axons of deep portions under the skin is therefore possible by forming a current path passing through deep portions under the skin between an electrode at a position for stimulation (a current source electrode) and ground electrodes with the neighboring electrodes therebetween provided.

An electro-tactile display switches over connections between each electrode and a current source and each electrode and ground over time, and displays information using arrayed electrodes by changing selections of an electrode at a position for stimulation to stimulate and ground electrodes. The foregoing switching of connection of the current source and ground occurring at the neighboring electrodes is carried out at higher speed than the switching connection of the current source and ground for information presentation. A preferred embodiment of switching circuit for carrying out the switching is a half-bridge circuit. A half-bridge circuit is provided with two switches that alternately open and close. When one of the switches is closed (and the other switch is open), an electrode and a current source are electrically connected, and with the other switch is closed (and the other switch is open), the electrode and ground are electrically connected.

In this specification, "neighboring electrode" refers to at least part of a plurality of electrodes in the vicinity of an electrode (normally one electrode but may also be a plurality) at a position for stimulation. "Neighboring electrode" is by no means limited to immediate neighboring electrodes of an electrode for the stimulation, and may also refer to secondary neighboring electrodes (electrodes neighboring the immediate neighboring electrodes).

In electrical stimulation using an array of electrodes, with regards to problems where sufficient stimulation is not possible in cases where electrode interval is narrow, it is possible to increase the amount of stimulation without deteriorating spatial resolution of the stimulation.

BRIEF DESCRIPTION OF THE DRAWINGS

FIG. 10 is a view illustrating interpolation using speed during use of a low speed camera;

BEST MODE FOR CARRYING OUT THE INVENTION

[A] An Electro-Tactile Display

Figure 1:
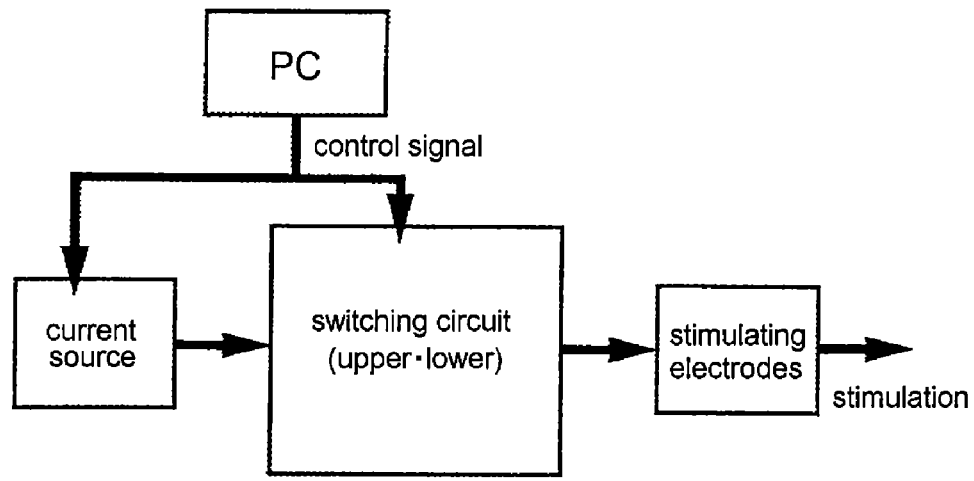
FIG. 1 is an overall view of an electro-tactile display system.

FIG. 1 is an overall view of an electro-tactile display system of the present invention. The system comprises a computer, a current source, a switching circuit and stimulating electrodes. The stimulating electrodes are arrayed electrodes comprised of a plurality of electrodes. Each electrode of the arrayed electrodes is electrically connected to the current source via the switching circuit. A current source electrode is then selected from the stimulation electrodes using a control signal from the computer, supplied with current, and stimulation is provided from the electrode supplied with current.

Figure 2:
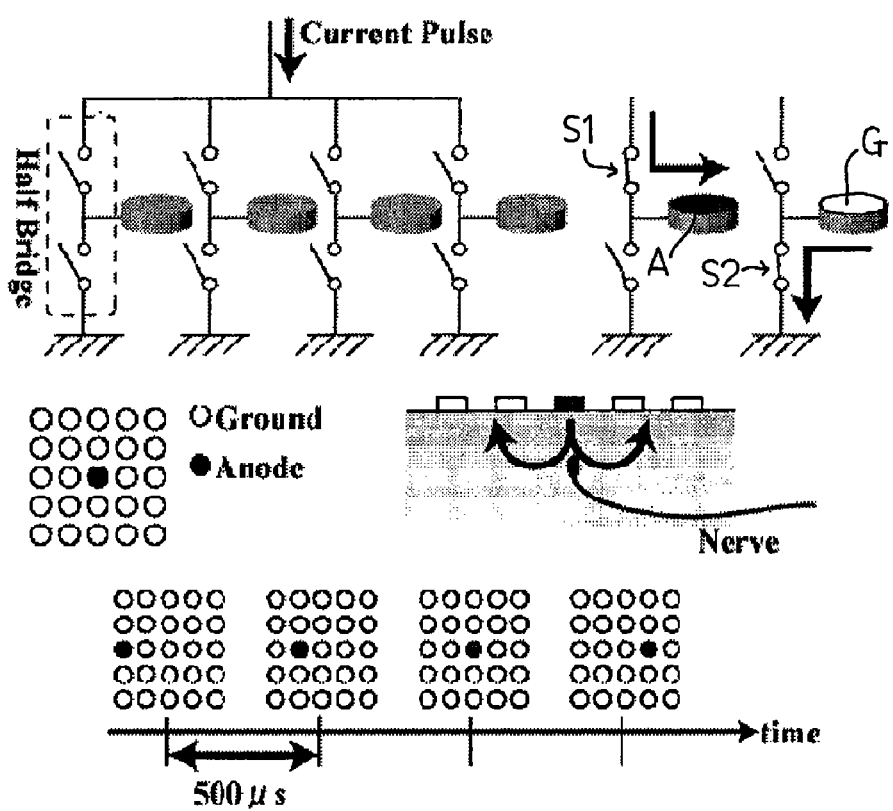
FIG. 2 is a view showing a basic electrical stimulation procedure using electrodes arranged in a two-dimensional matrix.

FIG. 2 shows a basic electrical stimulation procedure utilizing an electrode array arranged in the form of a two-dimensional matrix. Each electrode can be selectively connected to a current source and to ground using two switches S1 and S2 in a configuration known as a half-bridge circuit. Each electrode can be electrically connected to a current source or to ground by switching the switches S1 and S2. In the example of FIG. 2, each electrode is electrically connected to a current source via upper switch S1 of the switching circuit to operate as a current source electrode (anode electrode) A, while being electrically connected to ground via a lower switch S2 of the switching circuit to operate as a ground electrode G. A current path is then formed with underneath the skin by connecting an electrode of a location for stimulation to a current source and connecting other electrodes to ground and nerves are then stimulated. Then, by switching a stimulation point (selection of an electrode at a position for stimulation) over time, surface information can be presented with the arrayed electrodes.

The electrode array carrying out this electro-tactile sense presentation is configured by densely arraying a plurality of electrodes. This means that the distance between a current source electrode and a ground electrode is short and the current path formed below the skin is shallow. A problem therefore occurs where nerve axons N that are at deep sections cannot be sufficiently stimulated. Specifically, in the case of the skin of a fingertip, human tactile resolution is in the order of 1.5 mm and it is therefore wished to arrange electrodes at approximately 1.5 mm. However, an appropriate distance between the current source electrode and ground electrode in order to stimulate nerves underneath the skin is 2 to 3 mm. The problem described above is therefore extremely important.

Figure 3:
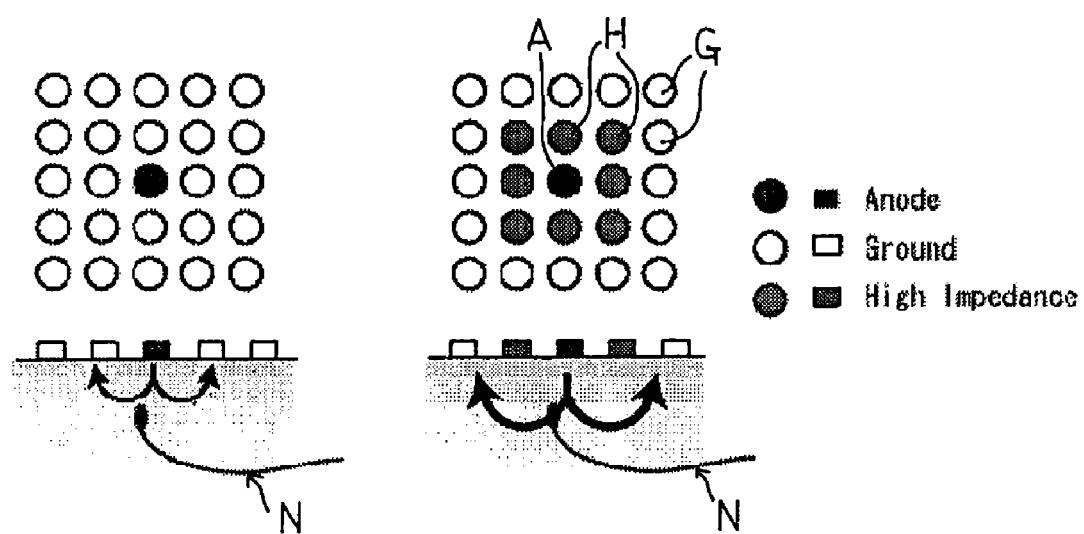
FIG. 3 relates to a situation where the interval between electrodes is too narrow, in the left side of FIG. 3 shows the situation when the current path passes through shallow sections of the skin but does not stimulate nerves N, and the right side of FIG. 3 shows when the distance between a current source and ground is made to be appropriate by making electrodes surrounding the current source high impedance.

If a high impedance mode is possible, as shown in the right side of FIG. 3, it is possible to broaden the distance between the current source and ground by making an electrode of a region in the vicinity of the current source electrode A a high impedance electrode H, and adopting a ground electrode G in a slightly distanced location. With regards to this, the present invention sets out to resolve this problem without using a high-impedance mode.

Figure 4:
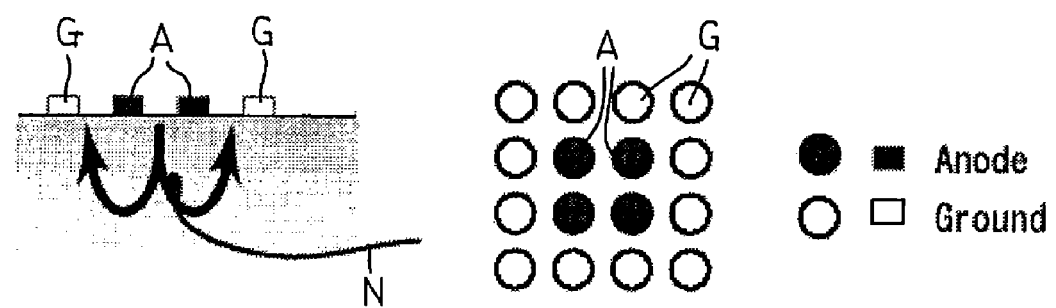
FIG. 4 shows the most basic resolving method for when electrode interval is narrow and electrodes cannot be made high-impedance, and is a technique where the current source size is made equivalently large.

Here, a method can be adopted as one resolving means where rather than there being one current source electrode, a plurality of current source electrodes are prepared as shown in FIG. 4 and the current source electrodes become larger in an equivalent manner so that current reaches to deep sections of the skin. This technique gives superior nerve stimulation without using high-impedance electrodes. The reason for this is as follows.

Figure 5:
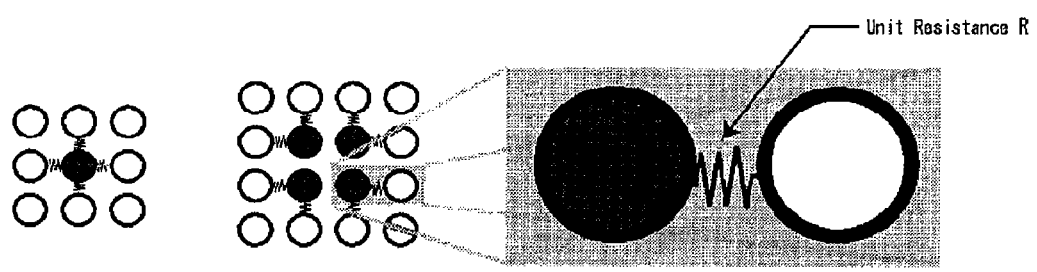
FIG. 5 is a view modeling the simplest resistance components for shallow sections of the skin, and a current path can be achieved that is proportional to the square root of the number of the current source electrodes.

The impedance (resistance) from the current source electrode to the ground electrode can be considered to be divided into a component passing through shallow sections of the skin and a component passing through deep sections of the skin. That relating to the shallow sections of the skin can be substantially modeled as shown in FIG. 5. When a resistance R is placed at a shallow section of the skin across a neighboring pair of a current source electrode and a ground electrode, the resistance of the whole of the shallow section of the skin across the current source and ground is inversely proportional to the number of pairs of current source electrode-ground electrode. In the case of FIG. 5, this is R/4 when there is one current source electrode, and is R/8 when four electrodes are used as the current source electrode. Typically, when the number of current source electrodes is N, the number of surrounding electrodes is proportional to the square root of N. The resistance of the shallow section of the skin is then inversely proportional to the square root of N and therefore falls. On the other hand, it is clear that the resistance of the path passing through the deep section of the skin is directly proportional to the contact surface, i.e. the number N of current source electrodes, and therefore falls. As a result of these two facts, the resistance of the path passing through the deep sections of the skin falls relatively when the current source electrodes increase. Deep sections of the skin therefore become the main current path as a result. The nerve axons N can therefore be considered to be more easily stimulated (here, the case of a two-dimensional electrode matrix is considered but the same also applies for a one-dimensional array).

This method does, however, have one drawback. This is that, because a plurality of electrodes are used as a current source at the same time, it is difficult to make use of this high electrode density and spatial resolution of tactile stimulation presented deteriorates.

Figure 6:
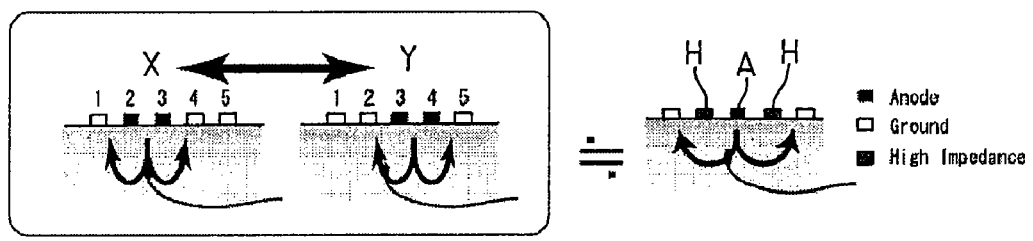
FIG. 6 is a view illustrating a proposed high-speed localized switching technique. By switching over electrodes 2 and 4 at high speed between both current-sourced and grounded states alternately, when time-averaged, this becomes the equivalent to a high-impedance electrode H where current does not flow in or out, as shown in the right side of the diagram.

Resolving means is therefore proposed in the following. The proposed resolving means is a method for providing a plurality of electrodes as a current source and switching selected electrodes at high-speed as shown in FIG. 6. In the X-state of FIG. 6, electrodes 2 and 3 of the five electrodes are taken as current sources, while in the Y-state, electrodes 3 and 4 are taken as current sources. This switching is at a higher speed than the electrode switching for presenting the surface pattern shown in FIG. 2. Specifically, switching for the switching in FIG. 2 is carried out at an interval of 500 µs to 10 ms but here this switching is carried out at an interval of 10 µs to 1 ms. The switching may take place one time or a number of times.

Considering the influence that this high-speed localized switching of electrodes has on nerve axons, the switching takes place at a speed that is in the order of the time constant of the nerve axons or more. This is therefore the equivalent of the nerve axons being subjected to the average electrical field of the electrical fields occurring at states X and Y to act. Considering electrodes 2 and 4, electrodes 2 and 4 are connected to ground for just half of the time, and are connected to the current sources for the remaining half of the time. Averaging over time, as shown in the right drawing in FIG. 6, there is no current going in or out and this can be seen as a high-impedance state. This state is the ideal state shown in the right side of FIG. 3.

An example of a high-speed switching procedure for the case of a two-dimensional electrode matrix is shown in FIG. 7. FIG. 7A shows the positional relationship between one electrode being an electrode (current source electrode) S at a position for stimulation, and electrodes in the vicinity of the electrode (current source electrode) S at the position for stimulation. Here, neighboring electrodes 1 to 8 are four electrodes 2, 4, 5 and 7 above, below, to the left and to the right of the electrode (current source electrode) S at the position for stimulation and four diagonal electrodes 1, 3, 6 and 8, giving "eight neighboring" electrodes.

Figure 7A:
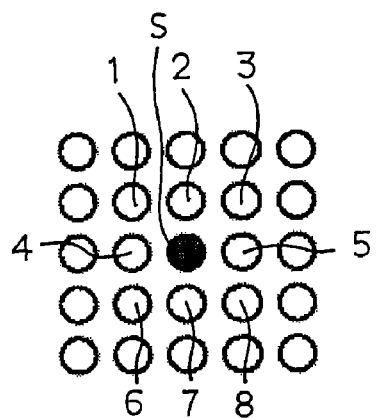
FIG. 7A shows an electrode S at a position for stimulation and the neighboring electrodes 1 to 8.
Figure 7B:
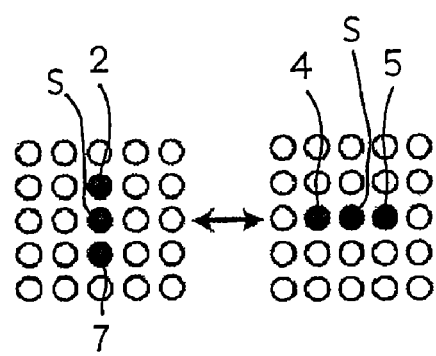
FIGS. 7B, 7C, and 7D are views showing an example of a technique for high-speed localized switching occurring at a two-dimensional matrix of electrodes.

FIG. 7B shows high-speed switching between "a first state where three electrodes, an electrode S at the position for stimulation and electrodes 2 and 7 neighboring above and below, are connected to a current source" and "a second state where three electrodes, the electrode S at the position for stimulation and electrodes 4 and 5 neighboring to the left and right, are connected to a current source". The electrodes 2, 4, 5 and 7 are connected to ground when not connected to a current source. The remaining electrodes are connected to ground. Considering the neighboring electrodes 2, 4, 5 and 7, the electrodes 2, 4, 5 and 7 are connected to ground for just half of the time, and are connected to the current sources for the remaining half of the time. Averaging over time, there is no current going in or out and this can be seen as a high-impedance state.

Figure 7C:
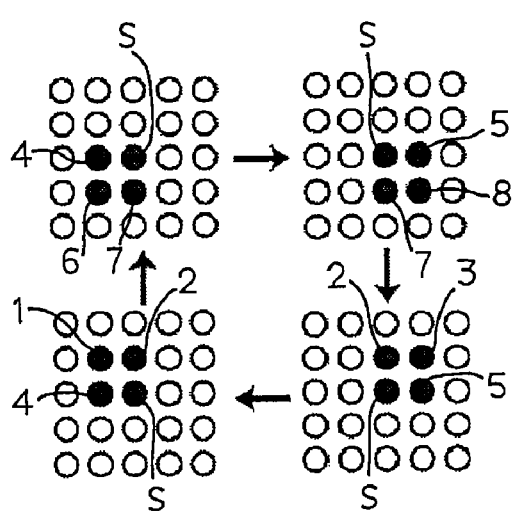

In FIG. 7C, sequential high-speed switching is carried out in the order of "a first state where four electrodes, the electrode S the a position for stimulation, the left neighboring electrode 4, the lower neighboring electrode 7, and the left diagonally neighboring electrode 6, are connected to the current source", "a second state where four electrodes, the electrode S at the position for stimulation, the right neighboring electrode 5, the lower neighboring electrode 7, and the right diagonally lower neighboring electrode 8, are connected to the current source", "a third state where four electrodes, the electrode S at the position for stimulation, the upper neighboring electrode 2, the right diagonally upper neighboring electrode 3, and the right neighboring electrode 5, are connected to the current source", and "a fourth state where four electrodes, the electrode S at the position for stimulation, the upper neighboring electrode 2, the left diagonally upper neighboring electrode 1 and the left neighboring electrode 4 are connected to the current source". The electrodes 1 to 8 are connected to ground when not connected to the current source. The remaining electrodes are connected to ground. Considering the upper, lower, left and right neighboring electrodes 2, 4, 5 and 7, electrodes 2, 4, 5 and 7 are connected to ground for just half of the time, and are connected to the current sources for the remaining half. Averaging over time, there is no current going in or out and this can be seen as a high-impedance state. Regarding the diagonally neighboring electrodes 1, 3, 6 and 8, a state where the amount of current flowing in and out as an average over time is small compared to the case of continuing connection to the current source or ground.

Figure 7D:
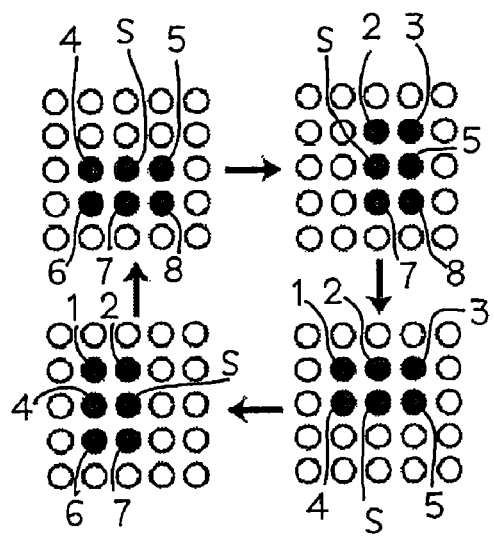

FIG. 7D shows carrying out of switching between "a first state where six electrodes, the electrode S at the position for stimulation, the left neighboring electrode 4, the lower neighboring electrode 7, the left diagonally lower neighboring electrode 6, the right neighboring electrode 5 and the right diagonally lower neighboring electrode 8, are connected to the current source", "a second state where six electrodes, the electrode S at the position for stimulation, the upper neighboring electrode 2, the right diagonally upper neighboring electrode 3, the right neighboring electrode 5, the lower neighboring electrode 7, and the right diagonally lower neighboring electrode 8 are connected to the current source", "a third state where six electrodes, the electrode at the position for stimulation, the upper neighboring electrode 2, the right diagonally upper neighboring electrode 3, the right neighboring electrode 5, the left diagonally upper neighboring electrode 1, and the left neighboring electrode 4 are connected to the current source", and "a fourth state where six electrodes, the electrode S at the position for stimulation, the upper neighboring electrode 2, the left diagonally upper neighboring electrode 1, the left neighboring electrode 4, the lower neighboring electrode 7, and the left diagonally lower neighboring electrode 6". The electrodes 1 to 8 are connected to ground when not connected to a current source. The remaining electrodes are connected to ground. Considering the diagonally neighboring electrodes 1, 3, 6 and 8, the electrodes 1, 3, 6 and 7 are connected to ground for just half of the time, and are connected to the current sources for the remaining half. Averaging over time, there is no current going in or out and this can be seen as a high-impedance state. Regarding the upper, lower, left and right neighboring electrodes 2, 4, 5, and 7, a state where the amount of current flowing in and out as an average over time is small compared to the case of continuing connection to the current source or to ground.

In FIG. 7, the one electrode (current source electrode) at the position for stimulation and "8-neighboring" neighboring electrodes 1 to 8 are shown but there may also be a plurality of electrodes at the position for stimulation and the way of setting the neighboring electrodes is by no means limited to "8-neighboring". Further, in FIG. 7, a two-dimensional matrix-shaped electrode array is shown but the manner of arranging the plurality of electrodes for the electrode array is by no means limited to a matrix shape and, for example, a linear or curved one-dimensional arrangement, or arrangement of a plurality of electrodes in a concentric manner centered about a certain electrode is also possible.

The proposed procedure for high-speed localized switching goes through the following:
(1) With electrical stimulation using a half-bridge circuit that does not possess a high impedance mode,
(2) using properties that nerve axons provide time-averaging electrical stimulation that is less than its time constant,
(3) by adjusting time averaging of current flowing into/flowing out of electrodes by high-speed switching of the current source and ground,
(4) it is possible to make a state equivalent to the current flow being zero (high-impedance), and
(5) stimulation of nerve axons of deep sections is possible.

Typically, not only can the time average for the current be made zero, but by changing the ratio of time an electrode is taken to be a current source and time an electrode is put to ground, it is possible to make an arbitrary electrical field below the skin.

[B] Visual-Tactile Conversion System

In this specification, a description is given of the present invention based on a visual-tactile conversion system that is a preferred embodiment. According to the visual-tactile conversion system disclosed in this specification, in addition to the present invention, several independently established new technological ideas are incorporated. In the following description, these new technological ideas as well as the present invention will be described. The technological ideas incorporated into the visual-tactile conversion system are as described below, with [B-5] corresponding to the present invention.

Hardware:
[B-1] Hardware configuration with a low-speed camera;
[B-2] Finger mount and electrode with a round tip;
[B-3] Volume adjustment using a force sensor; and
[B-4] Measurement of stimulation current/voltage and utilization of this information. Algorithm for electrical stimulation of nerves:
[B-5] High-speed localized switching; and
[B-6] Reduction of stimulation period duration.

[B-0] Overall Configuration of Visual-Tactile Conversion System

Figure 8:
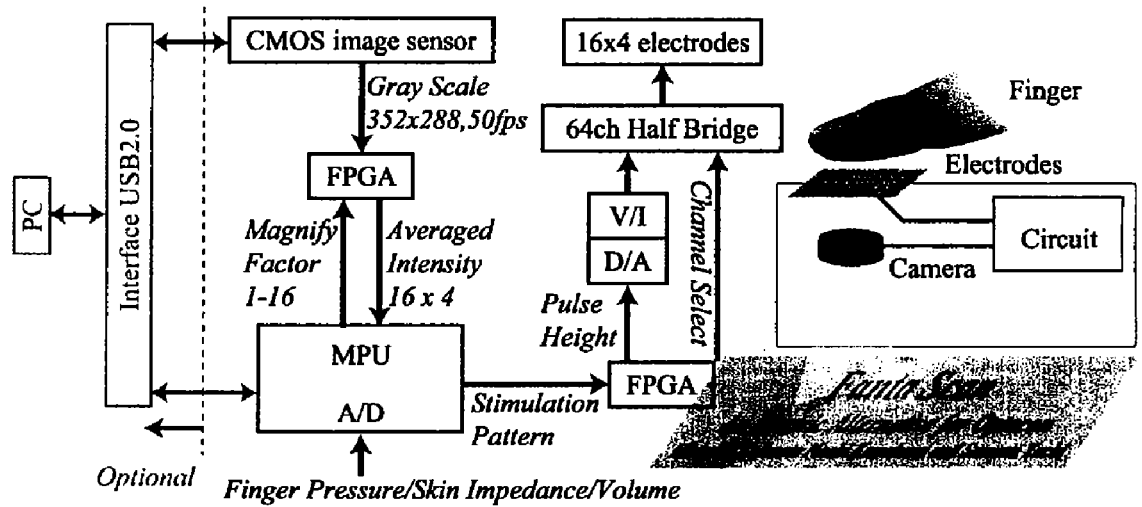
FIG. 8 is a view showing a visual-tactile conversion system.
Figure 9:
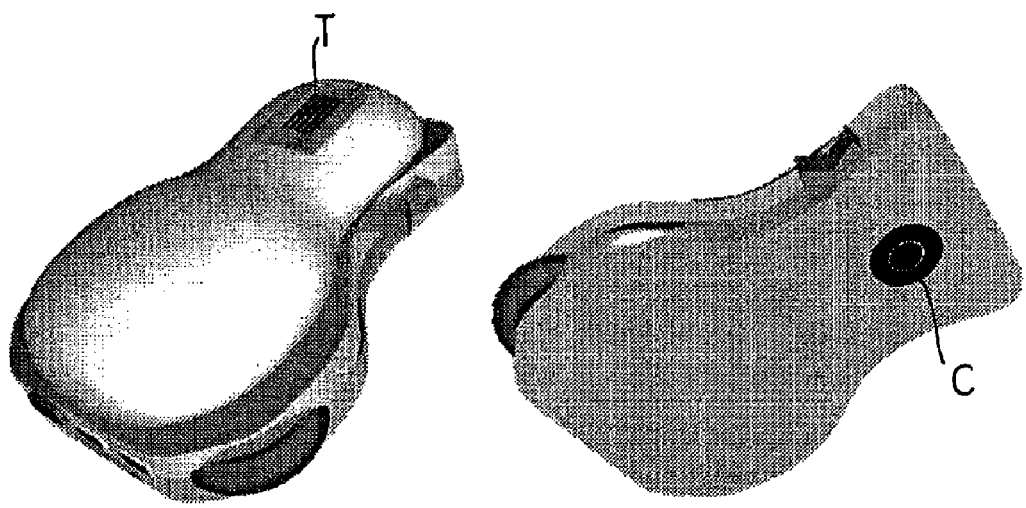
FIG. 9 is a view showing a visual-tactile conversion device combined with a camera, with the left side of FIG. 9 showing an electro-tactile display section T mounted on the upper surface of a device, and the right side showing a camera C mounted on the lower surface of a device.

FIG. 8 is a view showing an overall configuration for a visual-tactile conversion system provided with the high-speed localized switching method of the present invention. This system has an electro-tactile display and a camera. A preferred embodiment of the visual-tactile conversion system has a mouse-shaped device as shown in FIG. 9. An electro-tactile display T comprised of an electrode array is provided on an upper surface of the device, and a camera C is provided on a lower surface of the device. The electrode array comprises 64 electrodes arranged in a matrix shape with vertical rows of sixteen electrodes and horizontal rows of four electrodes. The diameter of each electrode of the electrode array is 1 mm, with an interval in a vertical direction being 1.25 mm, and an interval in a horizontal direction being 2.5 mm. The 64 electrodes can be selectively connected to a current source or to ground via a 64 channel half-bridge circuit.

The camera is designed to cover magnification factor from one to 16. For all magnification scales, the size of images obtained by the camera is the same as the size of the electro-tactile display or larger. For example, in the case of sixteen times magnification, it is necessary for a ¹/₁₆ partial image to be displayed with at least sixteen pixels (number of electrodes) in the vertical direction. The camera requires at least 256 (=16×16) pixels in the vertical direction. The camera is equipped with a CMOS image sensor as an imaging device, and has a performance of 50 [fps] at 352×288 pixels. Moreover, an intensity value of a position corresponding to 16×4 electrodes (average value of pixel values of a pixel region corresponding to one electrode) is calculated from image information (352×288 pixels) obtained by the camera.

A control section of the visual-tactile conversion system is comprised of an MPU, FPGA for tactile display use, and FPGA for camera use. The MPU acquires image intensity information inputted by the CMOS image sensor via the FPGA for camera use, and instructs the presentation of stimulation pattern information to the FPGA for tactile display use based on the acquired information. The FPGA for tactile display use switches over the switches of the half-bridge circuit and selectively connects electrodes to current sources or to ground so as to supply current to the electrodes in such a manner as to present predetermined stimulation pattern information. The visual-tactile conversion system has an input section that is inputted with information such as pressing force from a finger, skin impedance, and current volume adjustment etc. Current supplied to the electrodes is then regulated as necessary based on this inputted information. Further, the visual-tactile conversion system is capable of exchanging information with a desktop computer via an input/output section.

[B-1] Visual-Tactile Conversion in Combination with the Camera

Background and Object

The OPTACON is known as a system for carrying out visual-tactile conversion using a tactile display in combination with a camera. The OPTACON is a device that converts optical information inputted from a small-type camera into vibrations of pins so as to enable reading of characters and shapes by finger. With the OPTACON, the output of high-speed image measuring apparatus (a camera) correlates directly to stimulation intensity of each stimulating pin. The OPTACON uses mechanical vibrations to provide stimulation but the inventors of this application have developed the same kind of system using electrical stimulation. In the case of the OPTACON, the camera is held in the right hand and tactile sensations are presented to the left hand, whereas with the device developed by the inventors of this application, the camera is mounted on the tactile display, and is handled using the same hand. According to the visual-tactile conversion system of the prior art, the update period for the camera and the stimulation is in the order of 200 frames per second regardless of whether the stimulation is mechanical stimulation or electrical stimulation.

Current cameras such as for mobile phones etc. are much more prevalent and have become miniaturized. If such products proliferating the market are utilized, it is possible to make visual-tactile display at a much cheaper price than at present, and it is thought that this will play a role in causing the use of such display to become more widespread amongst the visually impaired. However, the now widespread small-type cameras only have image updating periods in the order of 15 fps and this information therefore cannot be used as is in tactile display. This is because tactile sensing has a time resolution in the order of 5 ms. Research has therefore been exhaustively made into how to adopt visual-tactile conversion system so as to make use of low speed cameras.

[Resolving Means 1 (Interpolation Using Velocity During Use of Low-Speed Cameras)]

First, current velocity is calculated from the newest image and a past image. This is possible by using well-known correlation calculations for between images. Next, the movement thereafter is estimated using the calculated velocity and stimulation is carried out in line with this estimation. As a result, for example, stimulation is possible every 200 fps, i.e. every 5 ms, even if camera image information is only acquired every 15 fps, i.e. every 66 ms. The situation here is shown in FIG. 10. The size of the image acquired by the camera is sufficiently large compared to the stimulation region. In this example, movement in a right upper direction is calculated, with stimulation taking place during movement of the stimulation region to the upper right taking place as a result. When image acquisition takes place every 66 ms and stimulation takes place every 5 ms, velocity is calculated every one image acquisition, and stimulation occurs 66/5=13 times based on this velocity and image. It is still preferable to prepare other means for this velocity detection because calculation cost of the calculation of correlation between images is high. For example, preparation of a separate velocity detection mechanism used in a mechanical or optical mouse may also be considered.

[Resolving Means 2 (Making High-Speed by Utilizing Interlaced Scanning in the Case of Using an Interlaced-Type Camera)]

Figure 11:
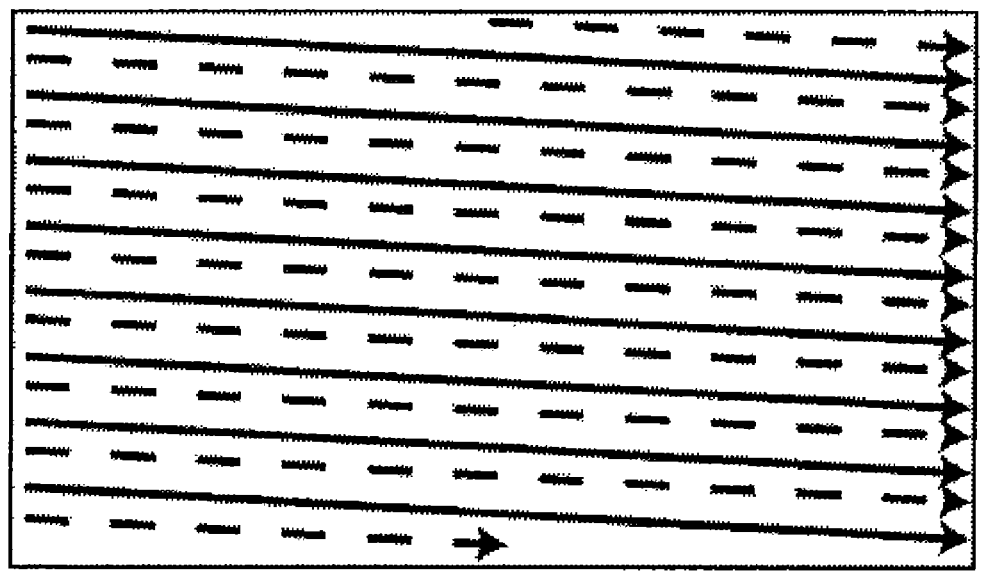
FIG. 11 is a view showing interlaced scanning for a camera.

Many of the cameras that are currently prevalent conform to standards such as NTSC, PAL and SECAM, etc. These cameras adopt interlacing methods. Namely, first, just half of the scanning lines of all of the scanning lines are scanned every other line and the remaining half are then scanned (FIG. 11). Namely, two vertical scans are carried out to pick-up one image. A stimulation pattern is generated every vertical scan when a camera for this system is used in a visual-tactile conversion system. As a result, 60 fps stimulation is possible using, for example, an approximately 30 fps NTSC camera. Each image obtained in two consecutive vertical scans is then spaced separated by one line portion precisely, the influence on the tactile presentation is minor, and correction is possible.

[B-2] Electrode with a Round Tip

Background and Object

The present invention prepares finger mount of the same rate of curvature as the finger in order to provide stability of finger position. The curved surface finger mount can be adopted in the OPTACON described above. According to the electro-tactile display of the prior art, when a normal finger mount is a flat electrode matrix, the contact portion of each electrode is also flat. However, when the finger mount is used, the angle of contact of the skin of the finger and the electrodes changes depending on the position.

Resolving Means

Figure 12:
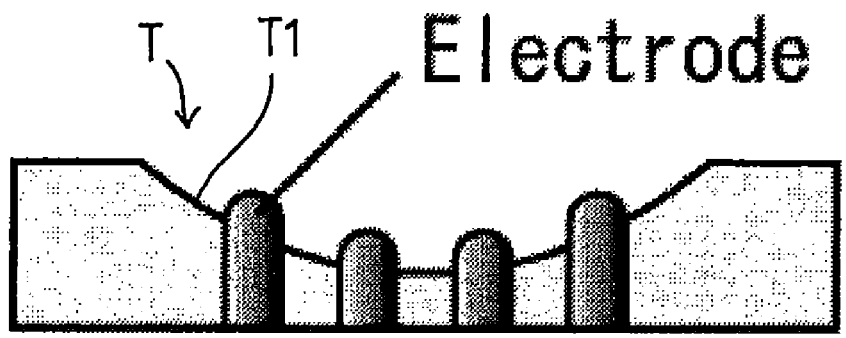
FIG. 12 shows a cross-section of a finger mount and rounded electrodes.

It is therefore necessary to make the tip of the electrode round as shown in FIG. 12 in order to ensure stable and reliable contact. In FIG. 12, a plurality of electrodes project from the curved finger mount T1 of the electro-tactile display 1. The tip of each electrode is formed in a curved surface (preferably spherical). Ideally, if the electrode tip is completely spherical, then the contact pressure will be stable and the contact surface area will also be constant whichever angle contact is made at. However, even without being exact, it can be understood that contact is made stable by making electrode contact section appropriately round and the resulting tactile sensations are also stable.

[B-3] Mode Switching by Force Sensor

Background and Object

Adjustment of stimulation current is also an extremely important problem in tactile sense presentation by electrical stimulation. With regards to this problem, the inventors of this application proposed measuring pressing force of a finger using information from force sensor so that the current is then a monotonically increasing function with respect to force (laid-open publication no. 2002-328596). In the electrical stimulation of the related art, there is the fear that a user may be subjected to a strong stimulation, for example, at the instant of touching (as a result of current becoming focused on a small contact surface area). However, by having the amount of stimulation correspond to the force, it is possible to actively control the extent of the tactile sensation. The corresponding relationship between the force and the extent of the tactile sensation increases monotonically, i.e. has a relationship where "a strong tactile sensation is returned when strong pressing takes place". This stimulation is the same as mechanical stimulation occurring in daily life and can be handled naturally. In the case of a mobile type, the degree of freedom of operation of the operator is low. It is therefore useful to provide the force sensor with a number of functions.

Resolving Means

Volume Function

In the method of the related art, the current and force have a 1 to 1 relationship. Namely, current flowing with respect to a certain force is decided uniquely. This is to say that $I=f(F)$, where I is current, F is force, and f is a function correlating current and force. In addition to this, strong pushing exceeding a certain threshold value is detected, and one parameter of the relational expression of current to force will be changed. Namely, when the relational expression of current and force is expressed as $I=g(F, k)$, where k is a parameter in a function, and g is a function for deducing current from force and parameters, the parameter k can be adjusted due to a strong pressing force. In the most simple example, strong pushing exceeding a threshold value is handled as "pushing down of the button" and the amount of current can be changed. For example, the current level is in three levels (weak, medium, strong), and a user may change from "weak"-"medium"-"strong"-"weak"-"medium"....

The important point is the point that this mode changing and control of the amount of current depending on this force of the related art co-exist. Namely, a control method of the related art is utilized with respect to pressing force where the threshold value is not exceeded. The mode changing described is hereinafter referred to as "volume adjustment". With regards to this, with, for example, a stationary electro-tactile display of the related art, volume adjustment is carried out using rotating type or sliding type input device but with a mobile electro-tactile display, it is difficult to use finger grip type input device. This invention can therefore typically be used in an electrical stimulation apparatus and in a preferred embodiment may be used in a mobile electrical stimulation apparatus.

The finger pressing force referred to here relates to finger pressing force of a finger to which tactile sensation is presented in the method of the related art but in the method on this occasion may refer to pressing force of a finger to which tactile sensation is presented to or may refer to other finger pressing force. For example, in the situation given in FIG. 15 and FIG. 16, the tactile display is provided between a first finger and a forefinger so as to be held by two fingers, with pressing force of the first finger and pressing force of the forefinger being equal.

[Safety Countermeasure 1 (Volume Initialization)]

The volume function described above is initialized when finger pressing force is less than a certain threshold value. According to the example described above, suppose that a volume is "strong" when a hand is withdrawn. When the hand makes contact again, the electrical state of the finger (electrical resistance due to perspiration etc.) is considered to have changed and remaining "strong" is taken to be dangerous. The volume is therefore returned to an initial state of "weak". This is essential with respect to safety of electrical stimulation, and may also be applied to the case of other volume adjustment methods (for example, adjustment by rotating type and slide type input apparatus) that do not use volume adjustment by pressure.

[Safety Countermeasure 2 (Multipoint Stimulation at the Time of Volume Adjustment)]

The pattern presented when the volume is changing is not the pattern presented at that time, but rather a multipoint pattern expanding over the whole of the presentation display is used. For example, all of the points are stimulated, or points every other one or two points are stimulated. This is because when the pattern presented at this time is an extremely small number of points, or when the points are extremely difficult or easy to cause a tactile sensation for compared to other points, it is not possible to perform appropriate volume adjustment based on the stimulation of these points. This measure is necessary because of fluctuations in the extent of a tactile sensation due to location of a finger in the event of electrical stimulation. With regards to reading speed adjustment, the speed is changed by the extent of three stages as a result of every pushing of one push button switch.

[B-4] Measurement of Stimulation Current/Voltage and Utilization of this Information Background and Object Approaches to estimating electrical impedance of skin based on skin structure by measuring stimulation current and voltage are well established. With regards to the finger tip, there is that carried out by the inventors of this application (Takahashi, Kajimoto, Kawakami, Kan, "electrical stimulation using two electrodes of an anode and cathode with the object of presenting sensations to skin", The Society of Instrument and Control Engineers System Integration Department Lecture (Tokyo, December 2003), 2B2-3, 2003). The object is to obtain a relationship of correlation between skin impedance and stimulation current tactile sense threshold value and connect this to stability of tactile sensations. However, a number of findings have been made with regards to the correlation relationship, but there has been no success with regards to achieving stable sensations. The following describes a novel way of utilizing impedance information.

[Resolving Means 1 (Power Saving)]

Saving consumed power is an important problem with regards to the mobile type electro-tactile display. The electric stimulation circuit is basically controlled by current. Even if the power supply voltage is fixed, the voltage actually applied to the skin depends on the resistance of the skin. Energy that is determined by the product of the resistance and current flowing as a result of a difference in voltage between the power supply voltage and the voltage on the skin is consumed as heat in the electrical circuit. It is possible to keep the power consumed low by dropping the power supply voltage to close to the voltage applied to the skin.

In a specific method, for example, a technique may be considered where the power supply voltage and voltage applied to the skin are compared and the power supply voltage is adjusted so that the difference becomes small. Alternatively, the command current and actual current flowing are compared, with the power supply voltage being raised if the actual current flowing is smaller than the command current, and being made to fall when this is not the case.

[Resolving Means 2 (Safety Countermeasures)]

It is possible to determine whether or not each electrode is reliably making contact with the skin by measuring impedance of every electrode. Here, a method is adopted where only points where contact is actually being made (=impedance is lower than set threshold value) are stimulated, with there being no stimulation when this is not the case. In particular, in the case of a multipoint electrical stimulation using a matrix-shaped electrode, it is likely that contact of end portions of contact area is insufficient. At this time, the electrical stimulation is carried out by electrical control. The voltage therefore dramatically rises at locations where the contact is insufficient (i.e. locations where the impedance is high). Substantial joule heat is therefore generated as a result and this leads to the generation of pain. A precise contact determination by measuring impedance of each electrode and switching of stimulation according to this determination is required at an electrode matrix in order to suppress the generation of the pain.

[Resolving Means 3 (Use as a Force Sensor)]

It is also possible to calculate the contact surface area of a finger by measuring impedance for each electrode. Basically, the contact surface area becomes broader as the pressing force of a finger becomes stronger. Contact surface area information can therefore be converted to force information. It can be used as a substitute for the force sensor described in [B-3]

[B-5] High-Speed Localized Switching

With regards to the problem that sufficient stimulation is not possible when electrode interval is narrow in electrode stimulation employing arrayed electrodes, the amount of stimulation is increased by a localized switching algorithm and spatial resolution of the stimulation is held as is. The electrode at a position for stimulation and electrodes in the vicinity of the electrode are used as current sources, and the neighboring electrodes other than the electrode at a position for stimulation are alternately switched at high-speed so as to alternate between a current source and ground. A detailed configuration is disclosed in [A].

[B-6] Reduction of Stimulation Period Duration

Background and Object

The inventors of this application propose accentuating temporal and spatial changes in electrical stimulation and then providing stimulation. This is a method of simulating a physical phenomena occurring in mechanical stimulation in electrical stimulation. Specifically, first, stimulation is further reinforced while stimulation is strengthened at certain stimulation points with respect to time. It is known that receptors responding only when deformation fluctuating with time occurs in the skin of a person (Meisner's corpuscles) exist. Time fluctuation is naturally reinforced by these receptors with mechanical stimulation. The same reinforcement is also implemented with electrical stimulation (Kajimoto, Inami, Kawakami and Tachi, The SmartSkin: Augmentation of Skin Sensation with Electro-Tactile Display; "Research into augmented reality (third report), Proceedings of the Virtual Reality Society of Japan Seventh Annual Conference (Tokyo, September 2002), pp. 149-152, 2002).

Figure 13:
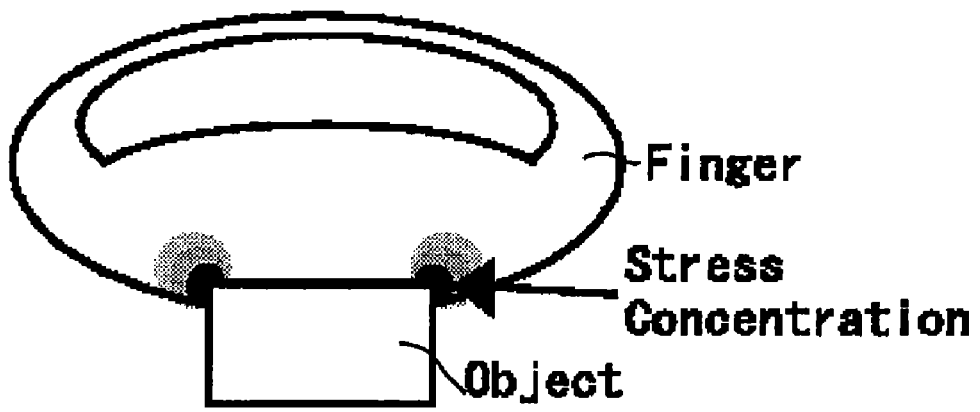
FIG. 13 is a view showing concentration of stress on an edge due to elastic body characteristics of a finger.
Figure 14:
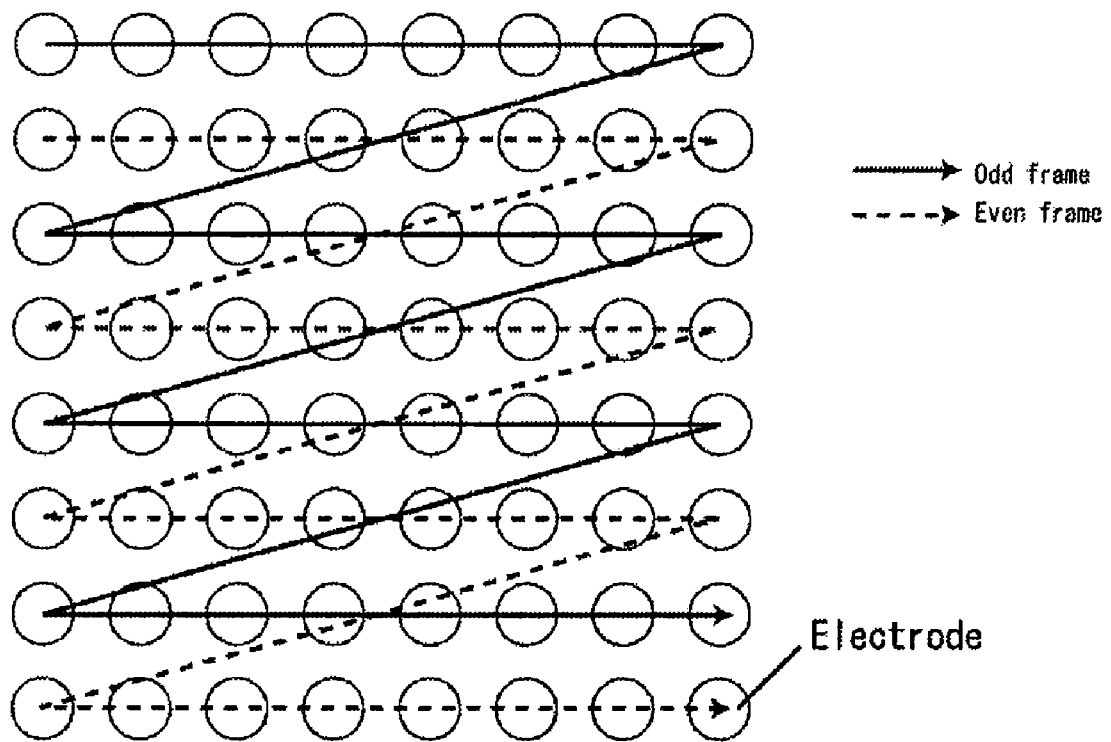
FIG. 14 is a view showing interlaced scanning occurring in electrical stimulation. The left side of FIG. 15 shows an example of using a mobile electro-tactile display, and the right side shows a stimulating electrode matrix.

Next, spatially, in the event of mechanical contact, as a result of a spatial band-pass filter characteristic (intermediate frequency pass characteristic) caused by the finger being an elastic body, stress is focused on edge portions of the contact surface, so that edge accentuation takes place naturally (FIG. 13). It has also been proposed to increase stimulation pulse frequency at edges in order to implement the same results for electro-stimulation ("Kajimoto, Kawakami, Maeda, Kan" Active Touch in Electrocutaneous Display", Proceedings of the Virtual Reality Society of Japan Sixth Annual Conference (Nagasaki, September 2001) pp. 489-490, 2001).

As a result of the above, with regards to a stimulation point for one point, three types of stimulation of "normal stimulation", "stimulation occurring due to temporal fluctuation (temporal edge stimulation)", and "stimulation accentuating spatial fluctuation (spatial edge stimulation)". Further, with stimulation occurring at a normal matrix electrode, the number of electrodes it is possible to stimulate at a certain time is one. Here, considering the time it takes for stimulation, when, for example, the number of electrodes is 64, when just the same time is allocated to the three types of stimulation, the time taken is 64×3=192 stimulation time units. Specifically, one electrical stimulation pulse takes approximately 500 μs. If this remains as is, overall stimulation takes approximately 100 ms and the stimulation period becomes approximately 10 fps. A stimulation period of at least 50 fps and preferably in the order of 200 fps is required for tactile sensations and it is therefore necessary to reduce the time required for stimulation.

[Resolving Means 1 (Interlaced Scan)]

First, the same interlaced scanning as for a visual display is considered. Namely, at a certain stimulation period, just every other row, i.e. half of the electrode matrix is stimulated, and at the next stimulation period, the remaining half are stimulated. As a result, even if the whole stimulation period becomes slow, the perception of the user is that a multiple of the stimulation period is obtained. It is not necessary for this measure to be carried out every other line as with a visual display, and a method may be considered where, for example, black portions of a checkerboard are stimulated in the first half of a period, with white portions being stimulated in the second half of the period. Further, a scan for one time is divided into two here but dividing into numbers other than two (for example, four) can also be considered.

[Selecting Means 2 (Selecting Stimulation According to Type of Stimulation)]

Next, a method for implementing more important stimulations more emphatically is shown for one stimulation point as described above using three types of stimulation of "normal stimulation", "spatial edge stimulation", and "temporal edge stimulation". First, time that can be used in stimulation of all points is fixed. This is decided from the stimulation period. In the following example, the stimulation period is taken to be 50 fps, and the time used in stimulation of all of the points is taken to be 20 ms. When time required to stimulate one point one time is taken to be 500 μs, then it is possible to stimulate forty points in 20 ms. Further, the overall number of electrodes is 64. The degree of importance of the three types of stimulation described above is "normal stimulation">"spatial edge stimulation">"temporal edge stimulation". The limited time therefore has to be consumed in this order. During a period of 20 ms, a stimulation point is only stimulated a maximum of one time. For example, when it is decided to carry out "normal stimulation", "spatial edge stimulation" is not carried out during the same stimulation period. Namely, the stimulation selection algorithm decides "which point" is to be stimulated of the 64 points during the next 20 ms but does not decide "how many times" each point is to be stimulated. This is zero time or one time.

The following algorithm is effective.
(1) Normal stimulation: Stimulation is possible up to a maximum of 40 points. First, it is determined whether the number of points is greater than or less than 40 points.
(2) Selection takes place as is if there are 40 points or less.
(3) If there are more than 40 points, 40 points are selected in accordance with some kind of evaluation reference value and the selection algorithm is complete. For example, ensuring that stimulation is distributed by making weighting of points stimulated a lot in the past from stimulation history less can be considered as an evaluation reference value. Further, it is also possible to use intensity values of images taken with a camera in a visual-tactile conversion system using a camera.
(4) The number of points decided upon for stimulation up until now is taken to be N.
(5) Spatial edge stimulation: Candidate points for stimulation are selected, and it is determined whether or not the number of candidate points exceeds 40 or is 40 or less inclusive of the number of stimulation points N decided up to now.
(6) Selection takes place as is if there are 40 points or less.
(7) If 40 points is exceeded, it is ensured that the total number of stimulation points becomes 40 in accordance with some kind of evaluation reference value and the selection algorithm ends. For example, sharpness of spatial edge may be taken as an evaluation reference value to give candidates.
(8) The number of stimulation points up until now may be taken to be N.
(9) Temporal edge stimulation: Candidate points for stimulation are selected, and it is determined whether or not the number of candidate points exceeds 40 or is 40 or less inclusive of the number of stimulation points N decided up to now.
(10) Selection takes place as is when there are less points.
(11) If exceeded, it is ensured that the total number of stimulation points becomes 40 in accordance with some kind of evaluation reference value and the selection algorithm ends. For example, sharpness of temporal edge may be taken as an evaluation reference value to give candidates.

By using the algorithm described above, it is possible to ensure that the number of stimulation points does not exceed a certain number and it is possible to keep the stimulation period constant. Further, in this way, a method may be considered where, rather than carrying out processing in order every type of stimulation, first, evaluation reference values for all of the types of stimulation occurring at each point of the stimulation points are obtained. Next, total assigned weighting values for the evaluation reference values for each type are obtained at each point. Finally, the number of stimulation points is selected by sorting the total assigned weighting values.

[C] Mobile Tactile Display

In the present invention, a description is given based on a visual-tactile conversion system but the present invention may also typically be broadly applied to an electro-tactile display. The electro-tactile display can be made small and lightweight compared to a tactile display using other mechanical means and has the benefits of having high energy efficiency and being robust. In a preferred embodiment, the present invention may be applied to a mobile tactile display. The following technological ideas may also be adopted for the hardware configuration for the mobile tactile display with the present invention incorporated.

[C-1] Movement of stimulation presentation using the thumb (Scroll);
[C-2] Changing of presentation stimulation according to orientation; and
[C-3] Separation of an electrode section from a main circuit.
[C-1] Method of Moving Presented Stimulation Using Thumb Background and Object The mobile tactile display has a problem in comparison to desktop type tactile display of the related art with respect to in what manner scrolling of presented tactile sensations should take place. For example, when Braille is presented, Braille of a few characters to a few tens of characters is lined up in a row for display at stationary type tactile display, with the user then tracing on these characters. However, with the mobile tactile display, a presentation portion can only be in the order of from one character to a few characters for Braille, and a method of moving a finger relative to the display is therefore not appropriate. It is thought to be appropriate to emulate relative movement of a finger and display by having a presentation pattern flow as with an electrically lit presentation board.

In the technology of the related art, a method is proposed where a tactile sense presentation apparatus is mounted on a device capable of detecting its own movement such as a mouse. The user then moves this device so that there is the feeling that a pattern fixed spatially is being traced as a result of changing the presentation pattern according to this movement. In this procedure, the apparatus for detecting movement is made large, and the operator handles the apparatus as a desktop tactile sense presenting apparatus even when carrying the apparatus outside and this apparatus cannot be said to be easy to use.

Resolving Means

Figure 15:
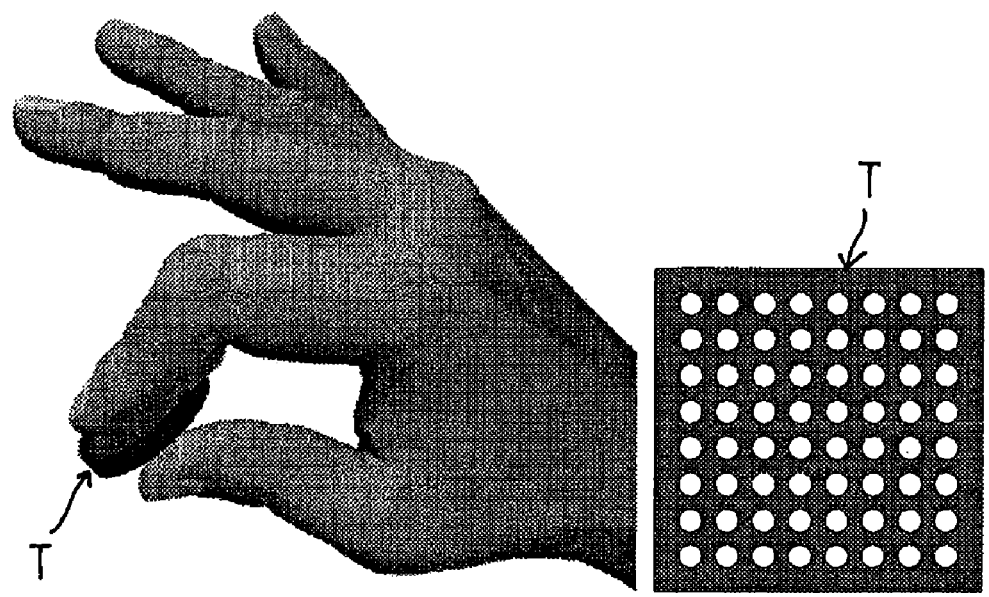
Figure 16:
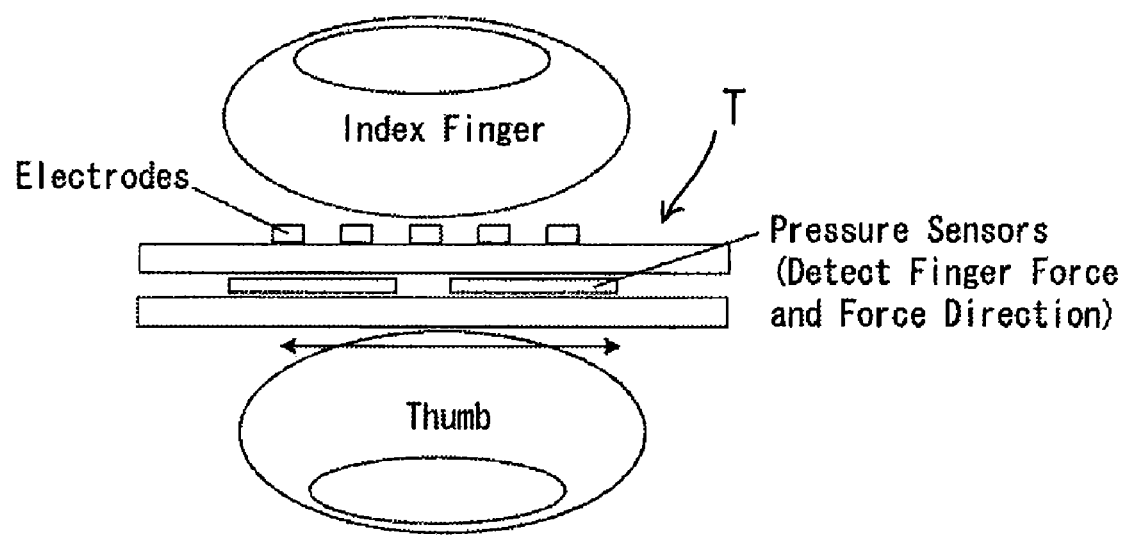
FIG. 16 is a cross-sectional view of a mobile electro-tactile display.

In regard to this, we propose a method for changing the presented pattern as result of operating in cooperation with a different finger to the finger tactile sensations are presented to. In FIG. 15, tactile sensations are presented to the forefinger, while the presented pattern is controlled using the thumb. An example of a specific internal configuration is shown in FIG. 16. A mobile tactile display T is comprised of a plate-shaped body, an electrode array composed of a plurality of electrodes provided at the surface of the body, and a plurality of film-shaped force sensors embedded in the body. The body is provided by sticking together two square-shaped plates, with a plurality of force sensors being interposed between the two plates. Electrodes for tactile sense presentation are arranged on the forefinger side. Force sensors are arranged between the thumb and the forefinger. It is then possible to detect where is currently being pressed by the thumb using the plurality of sensors. As a result of this, it is possible to move a pattern presented to the forefinger as a result of a tracing operation of the thumb.

Figure 17A:
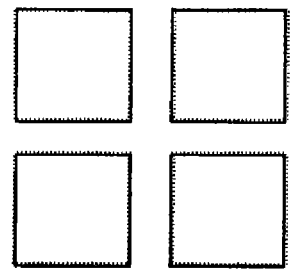
FIGS. 17A and 17B show illustrative arrangements for film-shaped force sensors.
Figure 17B:
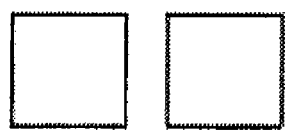

A plurality of sensors are required to detect the direction of tracing of the finger. An example arrangement for the case of using film-shaped force sensors as force sensors is shown in FIG. 17. In FIG. 17A, the position of the center of gravity of force currently being applied or the direction of the force is detected by four film-shaped force sensors. In this case, movement information for the finger can be detected with two degrees of freedom (up, down, left and right directions). If the direction of movement of the presented patter is limited to one direction, it is possible to adopt a configuration as in FIG. 17B where the number of force sensors can be reduced.

By moving the presentation pattern corresponding to the tracing operation of a finger, the user operates as if the user has a plate written with Braille between the finger presented with the tactile sensations and the tracing finger. It is therefore possible to handle this plate as if the plate is being actively moved. The user can therefore actively control the tracing speed, and can obtain a higher recognition performance due to movement of tactile sensations matching with movement of a finger that is active instructions of a person. It is possible to provide the volume function disclosed in [A-3] using the force sensor here.

It is also known that it is possible to determine contact of a finger and detect a tracing operation of a finger using methods such as optical methods or capacitance methods rather than using sensors. Further, a tracing operation of a finger is by no means essential and a method such as a so-called joy stick where a presented pattern is made to move by detecting the direction of pressing force is also possible. Namely, detection of the orientation of a finger is possible in place of detection of the amount of movement of a finger.

[C-2] Changing of Stimulation Presentation According to Orientation

Background and Object

With the desktop type tactile sense presentation apparatus of the related art, the pad of the finger is always directed downwards so as to make contact with the desktop display surface. With regards to this, with a mobile type tactile presentation apparatus, the apparatus is of a size that can be put in a hand and the orientation of the hand changes. Here, it is necessary to change the presentation pattern and the scroll direction.

Resolving Means

For example, a presentation pattern scrolled from right to left when the pad of the finger is directed downwards is made to be a scroll from left to right when the pad of the finger is directed upwards. As a result, scrolling is always from right to left when viewed from the body as a whole of the user. A person therefore perceives the direction of movement of a tactile sensation using a coordinate system for the body as a whole rather than a coordinate system for the tip of a finger, and recognition performance can be improved by making this kind of change. The orientation of the stimulation apparatus can be obtained by measuring the gravitational direction using, for example, a built-in acceleration sensor. The technological idea of changing presented patterns and scrolling direction using so-called world coordinates is by no means limited to electrical stimulation apparatus but can also be adopted in other mobile devices.

[C-3] Separation of an Electrode Section from a Main Circuit

Background and Object

Figure 18:
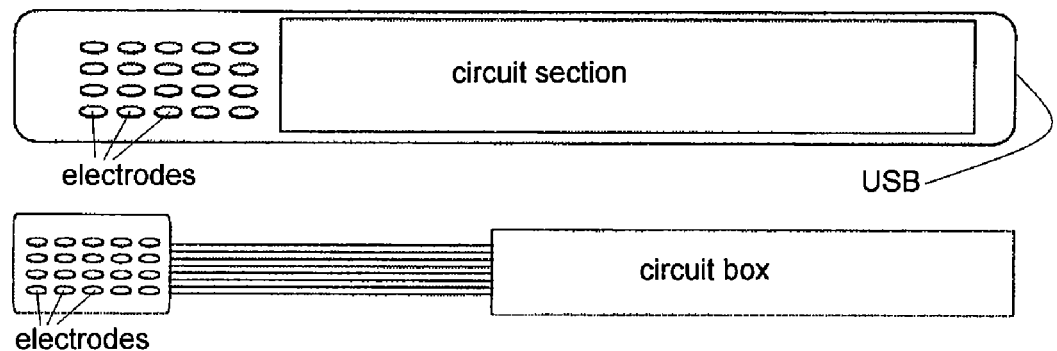
FIG. 18 is a related art configuration for an electrode section and a circuit.
Figure 19:
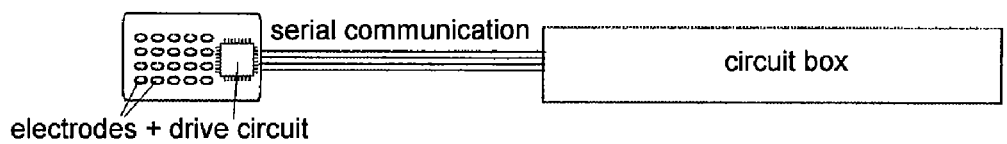
FIG. 19 shows a separation of a circuit having a switching circuit.

With an electrical stimulation apparatus, situations where electrodes and circuits are integrated are common in the related art. With regards to this, when considering portability, a method has been proposed where the circuit section and stimulating electrodes section are separate but are linked by a cable connected to each electrode (lower part of FIG. 18). This is exactly the situation of using earphones with a portable type audio player and enables an electrode portion held by hand to be extremely small and thin. However, in the case of using more electrodes than the few to a few tens of electrodes compatible with this method, there is the problem that the cable becomes thick.

Resolving Means

With regards to this, in a newly proposed method, a drive circuit is also mounted on the electrode side. Communication is then carried out between the drive circuit and a circuit box of a body. For example, electrodes providing stimulation are determined at a body side, and this instruction is sent to the drive circuit side. The drive circuit then deciphers the instruction signal and energizes the electrodes. The cable as a whole becomes thinner and easier to handle as a result of reducing the number of lines between the drive circuit and the circuit box of the body. Further, the thickness per each cable can be made thicker and the danger of damage to the cable is reduced. Moreover, in the method of the related art, an electrical stimulation pulse is sent through a long cable and corruption of the stimulation pulse waveform may therefore occur. In this method, the electrical stimulation pulse is generated by a circuit in the vicinity of the electrodes and it is therefore difficult for damage to the pulse waveform to occur. On the electrode side, it is also possible to mount a sensor system including force sensors and a camera, and the voltmeter and ammeter described in [B-4] on the electrode side. The sensors and the body can also be linked through communication. Further, the communication may also be wireless such as by using radio waves or infra red rays.

INDUSTRIAL APPLICABILITY

The present invention can be utilized in an electro-tactile display.

The invention claimed is:

1. An electro-tactile display comprising:
at least one current source;
arrayed electrodes;
a switching circuit for connecting each electrode to the current source or to ground; and
electrode selecting/switching means for selecting an electrode connected to the current source and an electrode connected to ground via said switching circuit and switching over the selected electrodes;
said electrode selecting/switching means further comprising:
first electrode selecting/switching means for connecting one or a plurality of electrodes at a position or positions for stimulation to the current source to provide one or a plurality of current source electrodes and switching over said selected current source electrodes at a predetermined time interval to present tactile sensations; and
second electrode selecting/switching means for alternately connecting a plurality of neighboring electrodes in the vicinity of said current source electrodes to the current source and to ground at a time interval shorter than said predetermined time interval, wherein switching by said first electrode selecting/switching means is carried out at an interval of 500 µs to 10 ms and wherein switching of said second electrode selecting/switching means is carried out at an interval of 10 µs to 1 ms.

2. The display of claim 1, wherein said switching circuit is a half-bridge circuit.

3. The display of claim 1, wherein said display is used for a visual-tactile conversion system comprising said display and a camera.

4. The display of claim 1, wherein said display is a portable display.

5. The display of claim 1, wherein said current source is an anodic current source.

6. The display of claim 1, wherein said arrayed electrodes are provided on a curved finger mount and wherein each electrode comprises a round tip to contact a finger.

7. The display of claim 1, wherein said first electrode selecting/switching means switching over said selected current source electrodes at the predetermined time interval in accordance with stimulation pattern information from a computer to present tactile sensations.

8. An electro-tactile displaying method comprising:
   selecting one or a plurality of electrodes from arrayed electrodes and connecting said selected electrodes to a current source to provide one or a plurality of current source electrodes;
   alternately connecting a plurality of neighboring electrodes in the vicinity of said current source electrodes to the current source and to ground;
   connecting a plurality of remaining electrodes other than said neighboring electrodes to ground to provide a plurality of ground electrodes;
   providing electrical stimulation from said current source electrodes, said current source electrodes being spaced apart from said ground electrodes via said neighboring electrodes; and
   switching over said selected current source electrodes at a predetermined time interval to present tactile sensations, wherein switching of neighboring electrodes is carried out at higher speed than the switching of a current source electrode for providing tactile sensations, and wherein switching of the selected current source electrodes is carried out at an interval of 500 µs to 10 ms and wherein switching of the neighboring electrodes is carried out at an interval of 10 µs to 1 ms.

* * * * *